United States Patent
Albert et al.

(10) Patent No.: US 7,377,290 B2
(45) Date of Patent: May 27, 2008

(54) VALVE ASSEMBLY WITH AN INTEGRATED CIRCUIT ARRANGEMENT

(75) Inventors: Bernd Albert, Knetzgau (DE); Jürgen Lindenthal, Eichenzell (DE); Stefan Rappelt, Gerolzhofen (DE); Christina Wittwer, Gochsheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 475 days.

(21) Appl. No.: 10/963,936

(22) Filed: Oct. 27, 2004

(65) Prior Publication Data

US 2006/0038149 A1 Feb. 23, 2006

(30) Foreign Application Priority Data

Oct. 28, 2003 (DE) .................. 103 50 400
Jul. 17, 2004 (DE) .................. 10 2004 034 726

(51) Int. Cl.
*F16K 31/02* (2006.01)

(52) U.S. Cl. ................... 137/375; 251/129.18

(58) Field of Classification Search ........... 251/129.15, 251/129.18; 137/375
See application file for complete search history.

(56) References Cited

U.S. PATENT DOCUMENTS

| 4,141,572 | A | | 2/1979 | Sorensen |
| 4,657,039 | A | * | 4/1987 | Bireley et al. ......... 137/624.11 |
| 4,898,360 | A | * | 2/1990 | VonHayn et al. ....... 251/129.15 |
| 4,943,083 | A | | 7/1990 | Groves et al. |
| 5,006,901 | A | | 4/1991 | Dick |
| 5,161,100 | A | * | 11/1992 | Whipple .................. 137/2 |
| 5,374,114 | A | | 12/1994 | Burgdorf et al. |
| 5,383,679 | A | | 1/1995 | Nakamura et al. |
| 5,595,270 | A | | 1/1997 | Braun et al. |
| 5,845,672 | A | * | 12/1998 | Reuter et al. ........... 251/129.15 |
| 5,937,975 | A | | 8/1999 | Förster |
| 6,095,489 | A | | 8/2000 | Kaneko et al. |
| 6,098,653 | A | * | 8/2000 | Kobow et al. ......... 251/129.18 |
| 6,291,988 | B1 | | 9/2001 | Hagen et al. |
| 2001/0049965 | A1 | * | 12/2001 | Groger ....................... 73/753 |
| 2003/0198734 | A1 | * | 10/2003 | Mann .......................... 427/96 |

FOREIGN PATENT DOCUMENTS

| DE | 41 33 641 | 4/1993 |
| DE | 43 20 446 | 2/1994 |
| DE | 44 27 559 | 8/1995 |
| DE | 195 45 011 | 4/1997 |

(Continued)

OTHER PUBLICATIONS

European Search Report dated Jun. 2, 2005.

*Primary Examiner*—John Bastianelli
(74) *Attorney, Agent, or Firm*—Cohen Pontani Lieberman & Pavane LLP

(57) ABSTRACT

A valve assembly for a vibration damper includes a valve housing, an actuator for driving an adjustable valve part, and a circuit arrangement having an opening which provides access to the actuator, wherein the actuator has a coil. The actuator and the circuit arrangement are arranged in the housing. A coating arranged on the circuit arrangement is shaped and dimensioned to position the circuit arrangement at a fixed position and orientation relative to the actuator. An outer plastic jacket is arranged over the coating of the circuit arrangement and encloses the coil of the actuator, so that the outer plastic jacket protects both the circuit arrangement and the coil.

2 Claims, 5 Drawing Sheets

FOREIGN PATENT DOCUMENTS

| | | |
|---|---|---|
| DE | 197 18 835 | 11/1998 |
| DE | 198 41 857 | 6/1999 |
| DE | 199 50 177 | 5/2000 |
| DE | 102 04 913 | 8/2003 |
| FR | 2 805 492 | 8/2001 |

* cited by examiner

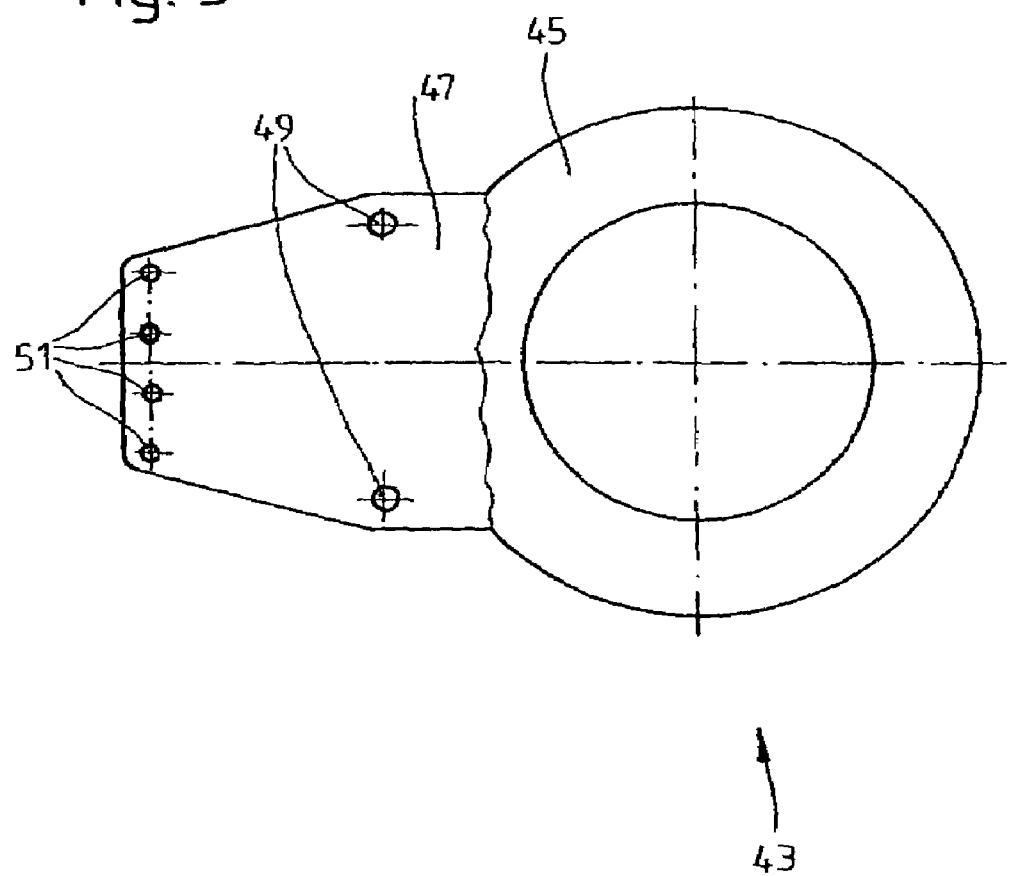

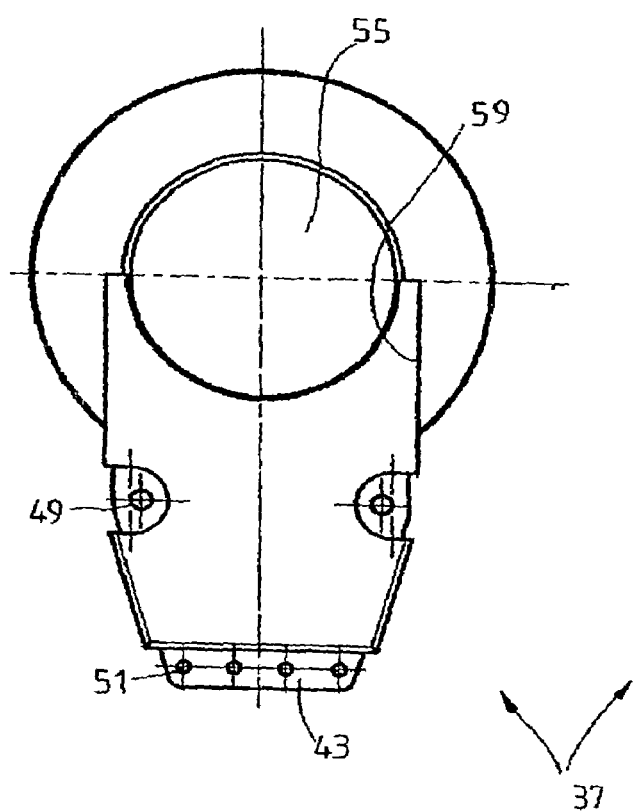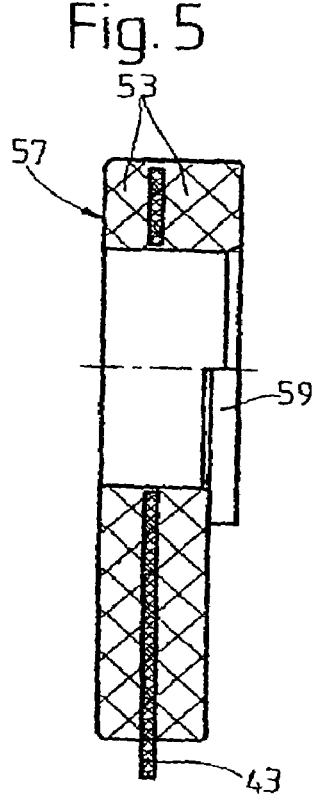

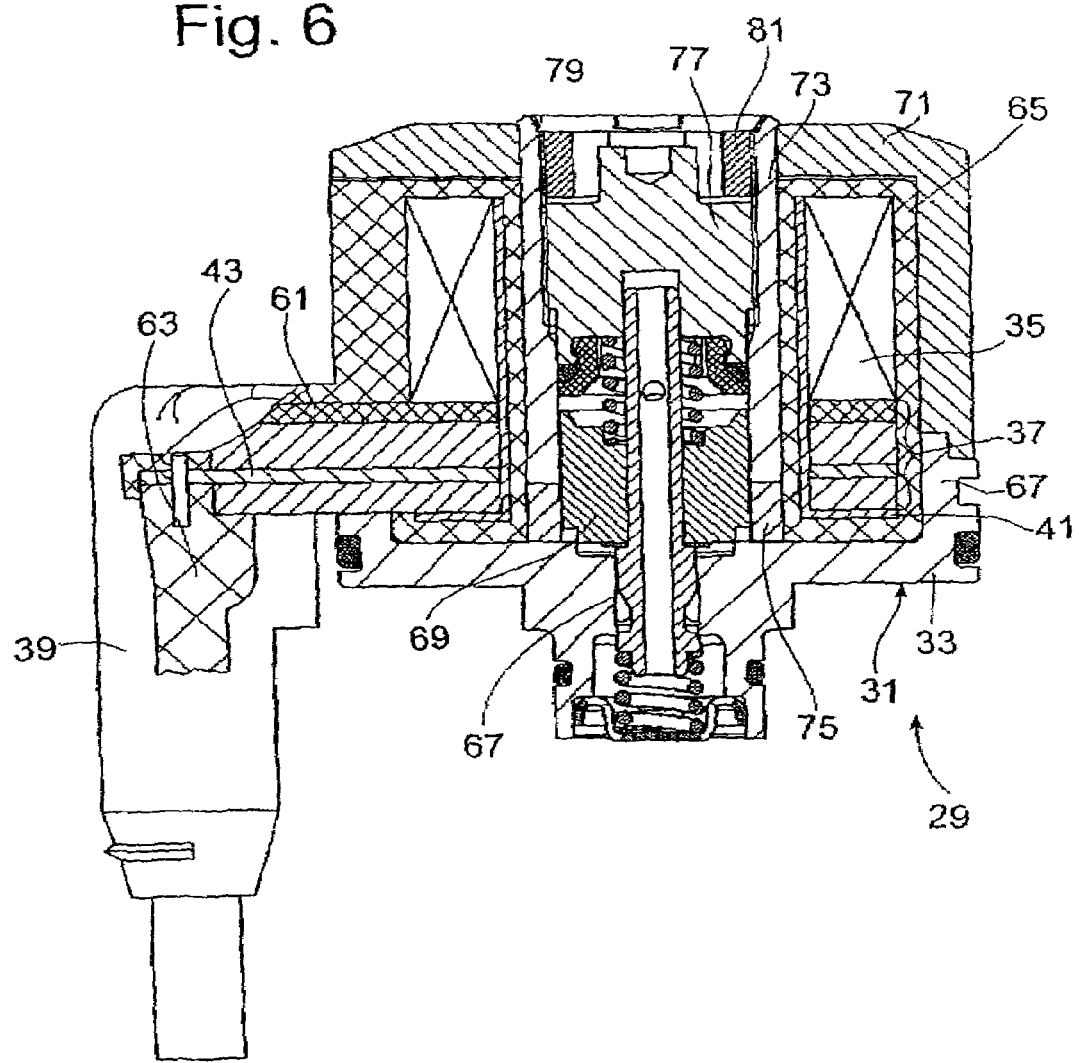

VALVE ASSEMBLY WITH AN INTEGRATED CIRCUIT ARRANGEMENT

BACKGROUND OF THE INVENTION

1. Field of the Invention

The invention pertains to a valve assembly, especially for a vibration damper, including a valve housing, an actuator for driving an adjustable valve, and an electronic circuit for controlling the actuator.

2. Description of the Related Art

It is known from DE 199 50 177 A1 that a vibration damper used as part of a chassis can be equipped with electronic components. The system configuration determines the complexity of the circuit arrangement. The specification does not provide any detailed information on how to implement the design in practice.

DE 44 27 559 A1 pertains to a vibration damper with variable damping force, to the valve assembly of which an acceleration sensor has been attached. The acceleration sensor is installed in a separate, disk-like housing, which covers the rear surface of an adjustable valve.

So that the valve assembly of an adjustable valve can be adjusted optimally, it is known from U.S. Pat. No. 5,937,975, for example, that a housing cap can be used, which allows access to the adjustable valve, e.g., to an adjusting screw, which can be used to adjust a spring which acts on an armature, or to a guide element, which can be used to adjust the magnetic flux inside a magnetic circuit.

It is impossible to use a disk-like housing on a valve assembly according to U.S. Pat. No. 5,937,975, because, if this were done, there would no longer be any effective way to adjust the valve assembly.

An alternative could be to mount the circuit arrangement in a separate housing on the vibration damper. This approach, however, is associated with the problem of how to route the cables to the valve assembly.

SUMMARY OF THE INVENTION

The task of the present invention is to realize the simplest and most load resistant possible way of attaching the circuit arrangement to the vibration damper.

According to the invention, the circuit arrangement has an opening which allows access to the actuator.

The great advantage of the invention is that the circuit arrangement is connected favorably to the adjustable valve part while access to the actuator is still possible.

It is provided that the circuit arrangement is realized on a circuit board having an annular section with the pass-through opening which provides access to the actuator. The circuit board offers a comparatively large mounting surface.

In an advantageous elaboration, it is provided that a movable actuator component is guided through the pass-through opening in the circuit board. This feature makes it possible for the actuator parts to be arranged coaxially to the circuit board. The circuit board can be located either above or below the coil body, so that a housing with a very short overall length can be selected.

In a further elaboration, the circuit board has a mounting area for electronic components adjacent to the annular section. The radially adjacent mounting area is used primarily for the larger electronic components.

According to an advantageous embodiment, the radial dimension of the circular ring-shaped mounting area matches that of the coil of the actuator. Thus the circuit board requires no more space than the coil. At the same time, the coil can be connected over a very short distance to the circuit board, on which in turn an electrical connection to a connecting cable is provided.

The circuit arrangement is located inside the valve housing. An externally mounted circuit board, as described in the state of the art, with all its disadvantages with respect to sensitivity to dirt and mechanical load capacity, can thus be avoided.

The circuit arrangement has a coating, which is realized as an inner housing. The coating has a mechanically strengthening effect on the circuit board and on the electronic components mounted on it.

In a further elaboration of the design, the coating of the circuit arrangement enters into a positive connection with the actuator for the purpose of positioning. This minimizes the risk of improper assembly.

So that the circuit arrangement can be protected effectively against dirt, it is provided with an outer plastic jacket, which encloses the coil of the actuator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows the circuit board as an isolated part;

FIGS. 4-5 show a coated circuit board; and

FIG. 6 shows a circuit arrangement which can be used as an alternative to that of FIG. 2.

DETAILED DESCRIPTION OF THE PRESENTLY PREFERRED EMBODIMENTS

Figure 1:
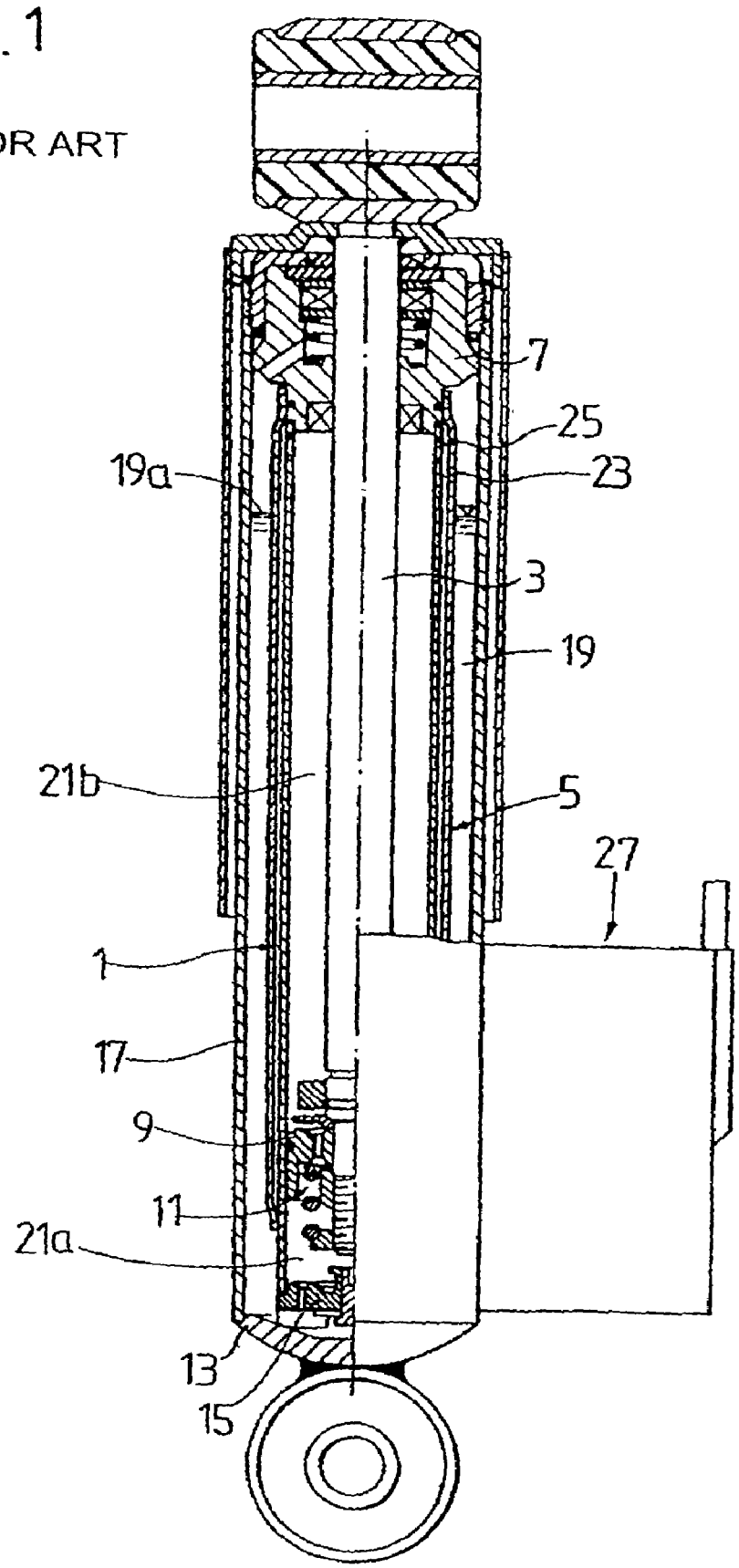
FIG. 1 illustrates how the invention can be applied to a vibration damper.

In FIG. 1, a vibration damper has a cylinder 1, in which a piston rod 3 is installed with freedom of axial movement. A guide and sealing unit 7 guides the piston rod 3 as it travels out from the top end of the cylinder. Inside the cylinder 1, a piston unit 9 with a piston valve arrangement 11 is mounted on the piston rod 3. The bottom end of the cylinder 1 is closed off by a bottom plate 13 with a bottom valve arrangement 15. The cylinder 1 is surrounded by a container tube 17. The container tube 17 and an intermediate tube 5 form a ring-shaped space 19, which serves as a compensating chamber. The space inside the cylinder 1 is divided by the piston unit 9 into a first working chamber 21a and a second working chamber 21b. The working chambers 21a and 21b are filled with hydraulic fluid. The compensating chamber 19 is filled with liquid up to the level 19a and above that with gas. Inside the compensating chamber 19, a first flow-conducting section, namely, a high-pressure subsection 23, is formed, which is connected by a bore 25 in the cylinder 1 to the second working chamber 21b. Adjacent to this high-pressure subsection is a shutoff valve device 27, attached laterally to the container tube 17. A second flow-conducting section (not shown), namely, a low-pressure subsection, proceeds from the valve device to the compensating chamber 19.

When the piston rod 3 travels upward out of the cylinder 1, the upper working chamber 21b becomes smaller. A positive pressure builds up in the upper working chamber 21b, which, as long as the shutoff valve arrangement 27 remains closed can be released only through the piston valve assembly 11 into the lower working chamber 21a. When the shutoff valve device 27 is opened, the fluid will also flow simultaneously from the upper working chamber 21b through the high-pressure subsection 23 and the shutoff valve device 27 into the compensating chamber 19. The damping characteristic of the vibration damper during the outward travel of the piston rod 3 therefore depends on whether the shutoff valve device 27 is open to a greater or lesser extent or is closed. The shutoff valve device can be adjusted either in discrete stages or in a continuously variable manner.

When the piston rod 3 travels inward into the cylinder 1, a positive pressure builds up in the lower working chamber 21a. Fluid can pass from the lower working chamber 21a through the piston valve arrangement 11 upward into the upper working chamber 21b. The fluid displaced by the increasing volume of the piston rod inside the cylinder 1 is expelled through the bottom valve arrangement 15 into the compensating chamber 19. Because the flow resistance of the piston valve arrangement 11 is lower than the flow-through resistance of the bottom valve arrangement 15, the pressure also increases in the upper working chamber 21b. If the shutoff valve device 27 is open, this increasing pressure can flow again through the high-pressure subsection 23 into the compensating space 19. This means that the vibration damper has a softer characteristic during inward travel when the shutoff valve device 27 is open and a harder characteristic when the shutoff valve device is closed, just as when the piston rod is traveling outward. The important point here is that the flow direction through the high-pressure subsection 23 of the bypass is always the same, regardless of whether the piston rod is traveling inward or outward.

Figure 2:
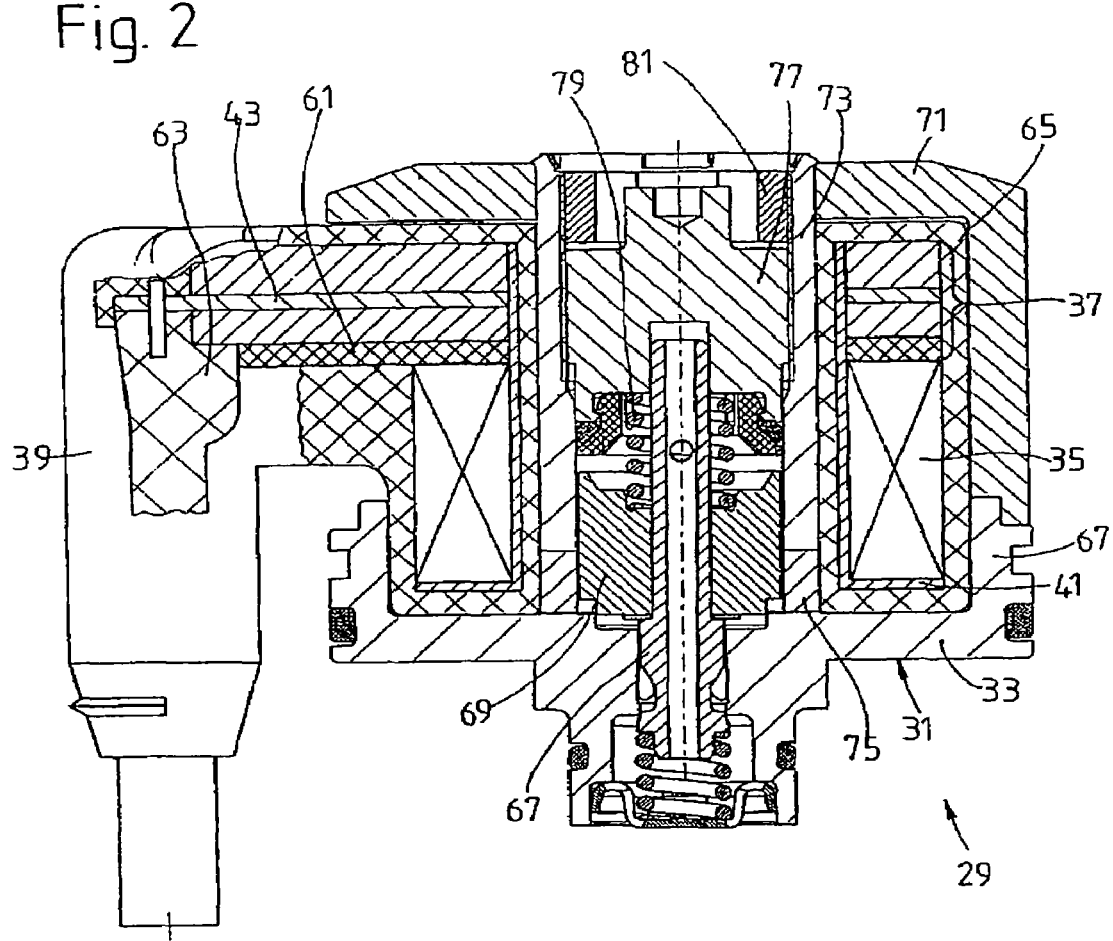
FIG. 2 shows a section of a shutoff valve assembly with the circuit arrangement.

FIG. 2 shows a part of the shutoff valve assembly 27, namely, the part including only the servovalve 29. A description of the main valve in working connection with the servovalve will not be provided here; for this purpose, reference is made to U.S. Pat. No. 5,937,975, which is incorporated herein by reference.

The servovalve 29 is held by a cup-like lower housing part 31. A structural unit, comprising a coil body 35 with a circuit arrangement 37 and a cable connection 39, is seated on the bottom 33 of the lower housing part. The coil body is wound around a carrier 41, preferably made of plastic. The circuit arrangement is positioned on the coil body. The circuit arrangement comprises a circuit board 43 according to FIG. 3, which has a circular ring-shaped mounting area 45 and a radially adjacent, trapezoidal mounting area 47. The radial dimension of the circular ring-shaped mounting area matches that of the coil. Two connecting openings 49 are used to drive the coil. In addition, the circuit board has several connecting openings 51 for the electronic components (not shown) on the circuit board. The trapezoidal mounting area 47 accepts the larger components. The geometric form of the circuit board was selected to fit in the available space and to make it possible for the structural unit to be jacketed in the best possible way.

FIGS. 4 and 5 show an isolated part of FIG. 2, namely, the circuit arrangement 37. The circuit board holds at least the mechanically sensitive electronic components, which must be protected in particular against dirt and moisture. For this purpose, a coating 53 is applied to the circuit board; the coating can be applied by the dip-coating process, for example, or it can consist of a curable foam such as polyurethane foam, which cures very quickly even on a production line. It is preferable to use a thermoplastic adhesive, which is applied in a low-pressure process. The pressure is less than 50 bars, and the temperature is approximately between 150-170° C., which is the range which can be tolerated by the electronic components. The coating protects the electronic components against mechanical loads.

Although the coating is missing in the area of the connections 49, 51 for the circuit board, it is otherwise—even in the area of the pass-through opening 55 in the circular ring-shaped circuit board area provided with a thickness which compensates for the different heights of the circuit arrangement, so that the top represents a flat and level surface 57. Even though the layer is several millimeters thick, the coating 53 cures very quickly. There is no need for the circuit arrangement to be set aside temporarily to cure during the course of production.

A radial groove 59 is provided in the bottom surface of the circuit arrangement; this groove is oriented toward a connecting disk 61 on the carrier 41 of the coil 35, so that there is only one way in which the coil 35 and the circuit arrangement 37 can be oriented with respect to each other. The connecting disk 61 also carries the plastic core 63 of a connecting cable 39, with the result that all of the components are aligned with each other. This structural unit consisting of the circuit arrangement 37, the carrier 41 with the coil 35, and the connecting cable 39 are provided with an outer plastic jacket 65, which is provided by a high-pressure injection process. The pressures which occur here are more than 300 bars, and the temperatures are above 300° C., but the coating 53 can withstand them reliably, so that the sensitive electronic components remain protected.

During the further course of the assembly work, this structural unit is placed in the cup-shaped lower housing part 31. An edge 32 of the lower housing part 31 centers the structural unit; as a result of the coating 53 and the outer plastic jacket 65, even strong vibrations can act on the structural unit without causing any mechanical damage. Then an axle body 67 and a ring-shaped body 69, which form the armature of the servovalve 29, are installed. The enclosing sleeve element 73 of a circular ring-shaped valve housing in the form of a housing cap 71, passes through the pass-through opening 55 in the structural unit consisting of the coil and circuit arrangement and extends as far as an insulator 75 on the bottom 33 of the lower housing part 31, so that the circuit arrangement is enclosed within the valve housing. The housing cap has an opening in the end, so that access is available through the pass-through opening inside the circuit arrangement to the adjusting screw 77, which can be used to adjust the elastic force of a spring 79 acting on the armature. In addition, an axially movable guide body 81 located axially in series with the adjusting screw inside the enclosing sleeve element can be used to adjust the magnetic flux. The housing cap 71 can be connected to the lower housing part 31 in several different ways. It could be connected positively by peening over the edge, for example, or by using a lock ring.

As a result of its placement inside the shutoff valve assembly 27, the circuit arrangement 37 is very well protected against the mechanical effects which act on it in a vibration damper.

FIG. 6 is intended to show that the circuit arrangement 37 can also be located underneath the coil body 35. The pass-through opening 55 (FIG. 4) is dimensioned here so that the enclosing sleeve element 73 and the insulator 75 can again be accommodated. As a result, it is again possible for the movable actuator component, namely, the ring-shaped body 69, the adjusting screw 77, and the movable guide body 81 to be located in the opening 55 in the circuit arrangement, so that a housing 71 with a very short overall axial length can be used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A valve assembly for a vibration damper, the valve assembly comprising:

a valve housing;

an actuator for driving an adjustable valve part, said actuator comprising a coil and being arranged in said housing;

a circuit arrangement cornprising a circuit board having an annular section surrounding an opening which provides access to said actuator, the circuit board further having a mounting section adjacent to the annular section, the annular section having a diameter which matches the diameter of the coil, said circuit arrangement being arranged in said housing, said circuit arrangement comprising a coating arranged and dimensioned to position said circuit arrangement at a fixed position and orientation relative to said actuator; and an outer plastic jacket arranged over said coating of said circuit arrangement and enclosing the coil of said actuator such that said outer plastic jacket protects both said circuit arrangement and said coil.

2. The valve assembly of claim 1 wherein said actuator comprises a component received in said opening.

* * * * *